United States Patent [19]

Suzuki et al.

[11] Patent Number: 5,006,426
[45] Date of Patent: Apr. 9, 1991

[54] ALKALINE STORAGE BATTERY

[75] Inventors: Norio Suzuki; Sennosuke Oda; Hiromi Maruyama; Kenichi Hoshino, all of Chigasaki, Japan

[73] Assignee: Matsushita Electric Industrial Co., Ltd., Japan

[21] Appl. No.: 426,640

[22] Filed: Oct. 26, 1989

[30] Foreign Application Priority Data

Aug. 23, 1989 [JP] Japan .................................. 1-216349

[51] Int. Cl.⁵ .............................................. H01M 6/10
[52] U.S. Cl. ........................................ 429/94; 429/211
[58] Field of Search .................. 429/94, 211, 161, 178

[56] References Cited

U.S. PATENT DOCUMENTS

| | | | |
|---|---|---|---|
| 3,503,806 | 3/1970 | Sugalski | 429/55 |
| 3,695,935 | 10/1972 | Cromer | 429/94 |
| 3,732,124 | 5/1973 | Cailley | 429/94 |
| 3,856,575 | 12/1974 | Hughes | 429/161 X |
| 3,900,340 | 8/1975 | Greaser et al. | 429/94 |
| 3,960,603 | 6/1976 | Morioka | 429/211 X |
| 4,049,882 | 9/1977 | Beatty | 429/94 |
| 4,255,500 | 3/1981 | Hooke | 429/94 |
| 4,332,867 | 6/1982 | Tsuda et al. | 429/94 |
| 4,452,869 | 6/1984 | DeMoully et al. | 429/161 X |
| 4,554,227 | 11/1985 | Takagaki et al. | 429/178 |
| 4,664,989 | 5/1987 | Johnson | 429/94 |

Primary Examiner—Anthony Skapars
Attorney, Agent, or Firm—Lowe, Price, LeBlanc, Becker & Shur

[57] ABSTRACT

An alkaline storage battery such as a sealed nickel-cadmium storage battery has an improved current collector tab structure connected as a current path to the marginal edge of a spirally coiled electrode of an electrode assembly. The current collector tab structure comprises either a plurality of current collector tabs or a single current collector tab comprising a current collecting tab and a lead tab thicker than the current collecting tab. With this arrangement, the internal resistance of the storage battery is reduced, and high-rate discharge performance is achieved.

8 Claims, 3 Drawing Sheets

ALKALINE STORAGE BATTERY

BACKGROUND OF THE INVENTION

1. Field of the Invention

The present invention relates to an alkaline storage battery such as a sealed nickel-cadmium storage battery or the like, and more particularly to an alkaline storage battery having an improved current collector tab structure for increased high-rate discharge performance.

2. Prior Art

One conventional alkaline storage battery is shown in FIGS. 8 and 9 of the accompanying drawings. The known alkaline storage battery has an electrode assembly 34 comprising a positive electrode 32 and a negative electrode 33 which are wound as spiral coils with a separator 31 interposed therebetween. The electrode assembly 34 is housed in a nickel-plated steel case 35 which doubles as the negative terminal of the storage battery. The positive electrode 32 has a terminal edge 36 projecting from one end of the electrode assembly 34, whereas the negative electrode 33 has a terminal edge 37 projecting from the other end of the electrode assembly 34. The terminal edge 36 is connected to an upper current collector tab 38 which comprises a circular collecting tab 39 welded to the terminal edge 36 and a rectangular lead tab 40 extending from the circular collecting tab 39, the rectangular lead tab 40 having a width smaller than the diameter of the circular collecting tab 39. The lead tab 40 is spot-welded to a sealing cover 41 of the case 35, the sealing cover 41 serving as the positive terminal of the storage battery. The terminal edge 37 is connected to a lower current collector tab 42 which comprises a circular collecting tab 43 welded to the terminal edge 37 and a tongue-shaped lead tab 44 attached to the center of the circular collecting tab 43. The lead tab 44 is spot-welded to the inner surface of the bottom of the case 35 at the center of the circular collecting tab 43.

It is known that the high-rate discharge performance of the alkaline storage battery of such a construction greatly varies depending on the internal resistance of the storage battery.

The current collector tabs 38, 42 are spot-welded to the terminal edges 36, 37, respectively, of the electrode assembly 34. To spot-weld such a current collector tab to a terminal edge of an electrode assembly, one surface of the current collector tab is held against the terminal edge of the electrode assembly, and a pair of spot-welding electrodes is disposed on the other surface of the current collector tab. The welding current which is supplied between the spot-welding electrodes flows from the terminal edge of the electrode assembly to the electrode assembly itself through the current collector tab. If the current collector tab, with its current collecting tab and lead tab having the same thickness, is increased in its overall thickness to reduce the electric resistance thereof, then when the current collector tab is welded to the terminal edge of the electrode assembly, the loss current flowing through the current collector tab is increased, thereby reducing the welding current flowing through the joint between the terminal edge of the electrode assembly and the current collector tab. As a result, the joint cannot be welded effectively. It is therefore preferable to reduce the thickness of the current collector tab in order to minimize the loss current which flows during the welding process. If the current collector tab is thinned, however, the electric resistance of the lead tab on which the current is concentrated is increased. Consequently, it is impossible to reduce the electric resistance of the lead tab and hence the entire current collector tab.

SUMMARY OF THE INVENTION

It is an object of the present invention to provide an alkaline storage battery which includes a current collector tab having a reduced electric resistance and exhibits increased high-rate discharge performance due to a low internal resistance, while allowing current collector tabs to be welded effectively to an electrode assembly.

According to the present invention, there is provided an alkaline storage battery comprising a case serving as one of positive and negative terminals, the case having an opening, an electrode assembly housed in the case, the electrode assembly comprising a positive electrode and a negative electrode which are wound as spiral coils with a separator interposed therebetween, the positive and negative electrodes having opposite terminal edges, a sealing cover mounted in the opening with an insulator gasket therebetween, the sealing cover serving as the other terminal, and a pair of current collector tab means for collecting an electric current, one of the current collector tab means electrically connecting the terminal edge of one of the positive and negative electrodes to the case, the other current collector tab mean electrically connecting the terminal edge of the other of the positive and negative electrodes to the sealing cover, one of the current collector tab means comprising a plurality of current collector tabs.

According to one aspect of the present invention, each of the current collector tabs comprises a current collecting tab electrically connected to the terminal edge of one of the electrodes and a lead tab electrically connected to one of the case and the sealing cover, the current collecting tab of one of the current collector tabs being welded to a portion of the terminal edge of said one electrode and the lead tab thereof being welded to the terminal edge of said one of the case and the sealing cover, the current collecting tab of the other current collector tab being welded to another portion of the terminal edge of said one electrode and the lead tab thereof being welded to said one of the base and the sealing cover.

According to another aspect of the present invention, each of the current collector tabs comprises a current collecting tab electrically connected to the terminal edge of one of the electrodes and a lead tab electrically connected to one of the case and the sealing cover, the current collecting tab of one of the current collector tabs being welded to the terminal edge of said one electrode, and the current collecting tab of the other current collector tab being welded to the first-mentioned current collecting tab.

According to still another aspect of the present invention, each of the current collector tabs comprises a substantially circular current collecting tab electrically connected to the terminal edge of one of the electrodes and a lead tab raised from the current collecting tab and electrically connected to one of the case and the sealing cover, the current collecting tab of one of the current collector tabs being welded to a portion of the terminal edge of said one electrode, and the current collecting tab of the other current collector tab being welded to another portion of the terminal edge of said one electrode and also to the first-mentioned current collecting tab, the lead tabs of the current collector tabs being disposed in confronting relation to each other.

According to yet another aspect of the present invention, the current collector tabs include a current collector tab comprising a current collecting tab electrically connected to the terminal edge of one of the electrodes and a lead tab electrically connected to one of the case and the sealing cover, and either one of a current collector tab consisting of only a current collecting tab and a current collector tab consisting of only a lead tab, the current collector tabs being welded to each other.

According to yet still another aspect of the present invention, each of the current collector tabs comprises a current collecting tab electrically connected to the terminal edge of one of the electrodes and a lead tab electrically connected to one of the case and the sealing cover, the lead tab of one of the current collector tabs being thicker than the lead tab of the other current collector tab.

According to the present invention, there is also provided an alkaline storage battery comprising a case serving as one of positive and negative terminals, the case having an opening, an electrode assembly housed in the case, the electrode assembly comprising a positive electrode and a negative electrode which are wound as spiral coils with a separator interposed therebetween, the positive and negative electrodes having opposite terminal edges, a sealing cover mounted in the opening with an insulator gasket therebetween, the sealing cover serving as the other terminal, and a pair of current collector tabs for collecting an electric current, one of the current collector tabs electrically connecting the terminal edge of one of the positive and negative electrodes to the case, the other current collector tabs electrically connecting the terminal edge of the other of the positive and negative electrodes to the sealing cover, each of the current collector tabs comprising a current collecting tab and a lead tab joined thereto, the lead tab of one of the current collector tabs being thicker than the current collecting tab thereof.

The current collecting tab which is thinner than the lead tab of said one current collector tab is of such a thickness as to reduce a reactive current which flows through the surface of the current collecting tab when said one current collector tab is welded to the marginal edge of said one electrode.

Since a plurality of current collector tabs are employed or the lead tab of a current collector tab is thicker than the current collecting tab thereof, the electric resistance of the current collector tabs is reduced, thereby improving the high-rate discharge performance of the alkaline storage battery which is of a low internal resistance.

The above and other objects, features and advantages of the present invention will become more apparent from the following description when taken in conjunction with the accompanying drawings in which preferred embodiments of the present invention are shown by way of illustrative example.

DETAILED DESCRIPTION

Figure 1:
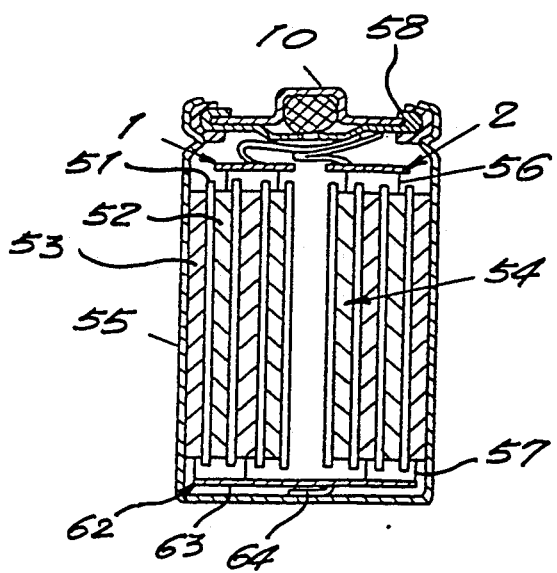
FIG. 1 is a longitudinal cross-sectional view of an alkaline storage battery according to a first embodiment of the present invention.
Figure 2:
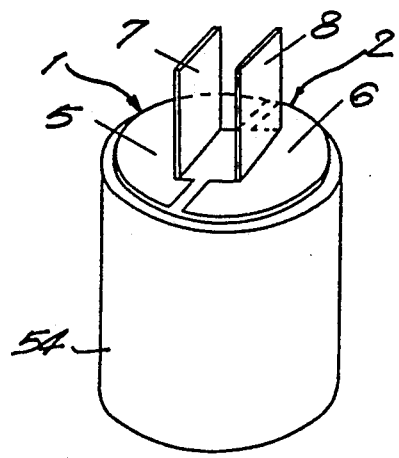
FIG. 2 is a perspective view of an internal structure of the alkaline storage battery shown in FIG. 1, showing upper current collector tabs from which lead tabs extend and an electrode assembly.

FIGS. 1 and 2 show an alkaline storage battery according to a first embodiment of the present invention. The alkaline storage battery according to the first embodiment is in the form a nickel-cadmium storage battery having the nominal capacity of 1.2 Ah. The alkaline storage battery includes an electrode assembly 54 comprising a positive electrode 52 and negative electrode 53 which are wound as spiral coils with a separator 51 interposed therebetween. The electrode assembly 54 is housed in a nickel-plated steel case 55 which doubles as the negative terminal of the storage battery. The positive electrode 52 has a terminal edge 56 projecting from one end of the electrode assembly 54, whereas the negative electrode 53 has a terminal edge 57 projecting from the other end of the electrode assembly 54.

The alkaline storage battery has two upper current collector tabs 1, 2 connected to the terminal edge 56 of the positive electrode 52. The upper current collector tabs 1, 2 comprise respective semicircular current collecting tabs 5, 6 spot-welded to the terminal edge 56 of the positive electrode 52, and respective rectangular lead tabs 7, 8 extending upwardly from the current collecting tabs 5, 6, respectively. The upper current collector tabs 1, 2 have a thickness of 0.15 mm. The lead tabs 7, 8 are disposed in confronting relation to each other and have distal ends spot-welded to a sealing cover 10 of the case 55, the sealing cover 10 doubling as the positive terminal of the storage battery. The sealing cover 10 is mounted in an end opening of the case 55 with an insulating seal ring 58 therebetween. The terminal edge 57 is connected to a lower current collector tab 62 which comprises a circular collecting tab 63 spot-welded to the terminal edge 57 and a tongue-shaped lead tab 64 attached to the center of the circular collecting tab 63. The lead tab 64 is spot-welded to the inner surface of the bottom of the case 55 at the center of the circular collecting tab 63.

The storage battery thus constructed will be referred to as a storage battery A. An electric current supplied from the current collecting tabs 5, 6 of the two current collector tabs 1, 2 flows to the sealing cover 10 through the lead tabs 7, 8 joined to the current collecting tabs 5, 6. According to the storage battery A, the density of the current flowing through the current collecting tabs 5, 6 and the lead tabs 7, 8 is reduced to half, and the electric resistance of the current collector tabs 1, 2 is substantially reduced. The internal resistance of the storage battery A is about 20% lower than the internal resistance of a conventional nickel-cadmium storage battery.

To spot-weld the current collecting tabs 5, 6 to the electrode assembly 54, pair of welding electrodes is held against the current collecting tabs 5, 6, respectively, and a welding current is passed between the welding electrodes. Therefore, the welding current is concentrated on joints between the current collecting tabs 5, 6 and the terminal edge 56 of the positive electrode 52.

Another storage battery, referred to as a storage battery B, according to the first embodiment of the present invention is similar to the storage battery A except that upper current collector tabs have a greater thickness of 0.20 mm. The internal resistance of the storage battery B is about 25% lower than the internal resistance of a conventional nickel-cadmium storage battery.

While two upper current collector tabs are employed in the storage batteries of the first embodiment, more upper current collector tabs and/or a plurality of lower current collector tabs may be employed.

Figure 3:
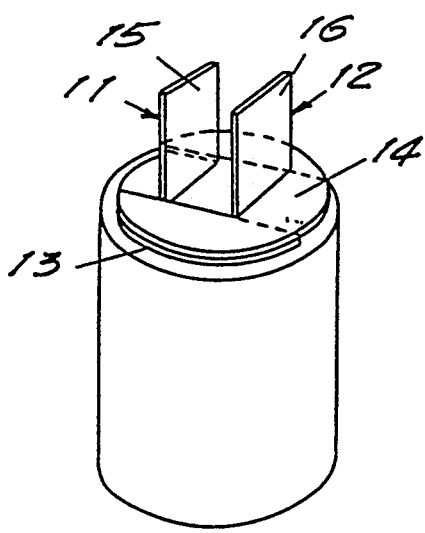
FIG. 3 is a perspective view of an internal structure of an alkaline storage battery according to a second embodiment of the present invention.

FIG. 3 shows an internal structure of an alkaline storage battery according to a second embodiment of the present invention. The alkaline storage battery of the second embodiment is a nickel-cadmium storage battery having the nominal capacity of 1.2 Ah, and differs from the alkaline storage batteries of the first embodiment only with respect to two upper current collector tabs 11, 12. More specifically, the upper current collector tab 11 is positioned underneath the upper current collector tab 12. The upper current collector tab 11 comprises a substantially circular current collecting tab 13 welded to the terminal edge of the positive electrode and a rectangular lead tab 15 raised, by lancing, and extending upwardly from the current collecting tab 13. The other upper current collector tab 12 has a substantially circular current collecting tab 14 including a surface area welded to a portion of the marginal edge of the positive electrode and the other surface area welded to the current collecting tab 13 and a lead tab 16 raised, by lancing, and extending upwardly from the current collecting tab 14. The lead tabs 15, 16 are disposed in confronting relation to each other. The storage battery thus constructed will be referred to as a storage battery C. The internal resistance of the storage battery C is about 30% lower than the internal resistance of a conventional nickel-cadmium storage battery. For further reducing the internal resistance of the storage battery, a stack of more current collector tabs which are successively welded may be employed. Furthermore, two or more lower current collector tabs may be employed and arranged in the same manner as the upper current collector tabs.

Figure 4:
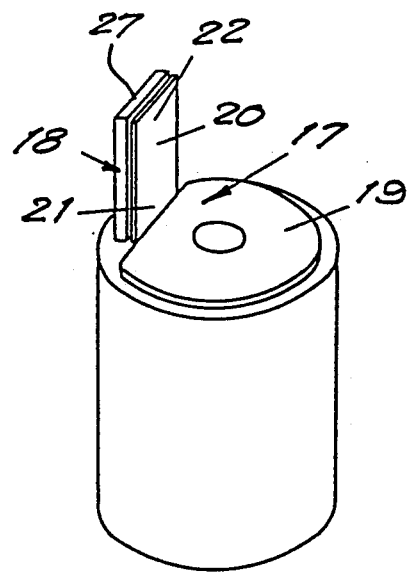
FIG. 4 is a perspective view of an internal structure of an alkaline storage battery according to a third embodiment of the present invention.

FIG. 4 shows an internal structure of an alkaline storage battery according to a third embodiment of the present invention. The alkaline storage battery of the third embodiment is a nickel-cadmium storage battery having the nominal capacity of 1.2 Ah, and comprises two upper current collector tabs 17, 18, the other structural details being the same as those of the storage battery shown in FIG. 1. The upper current collector tab 17 comprises a substantially circular current collecting tab 19 welded to the terminal edge of the positive electrode and a rectangular lead tab 20 connected to and extending upwardly from the current collecting tab 19. The other upper current collector tab 18 comprises only a rectangular lead tab 27 which is spot-welded to the lead tab 20 at an area 21 near the current collecting tab 19 and an area 22 near the distal end of the lead tab 27 which is spot-welded to a sealing cover (not shown). The lead tabs 20, 27 which are spot-welded provide a reduced electric resistance to a current flowing therethrough. The storage battery shown in FIG. 4 will be referred to as a storage battery D.

Figure 5:
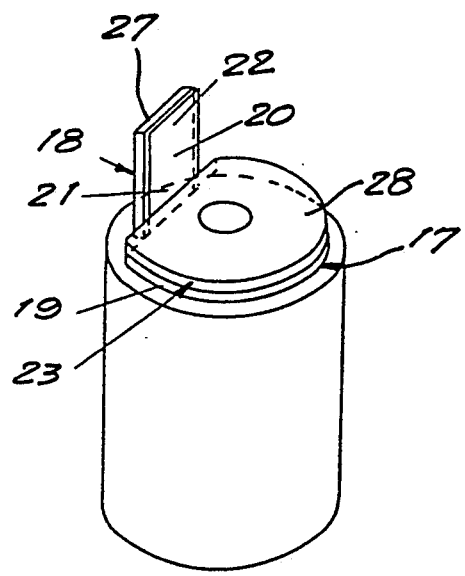
FIG. 5 is a perspective view of an internal structure of an alkaline storage battery according to a fourth embodiment of the present invention.

According to a fourth embodiment shown in FIG. 5, a storage battery differs from the storage battery of FIG. 4 only in that another upper current collector tab 23 comprising a substantially circular current collector tab 28 is mounted on and spot-welded to the current collecting tab 19. The storage battery shown in FIG. 5 will be referred to as a storage battery E. The internal resistances of the storage batteries D, E are about 35% and 40%, respectively, lower than the internal resistance of a conventional nickel-cadmium storage battery.

In each of the embodiments shown in FIGS. 4 and 5, the lower current collector tab may be constructed in the same manner as the upper current collector tabs.

Figure 6:
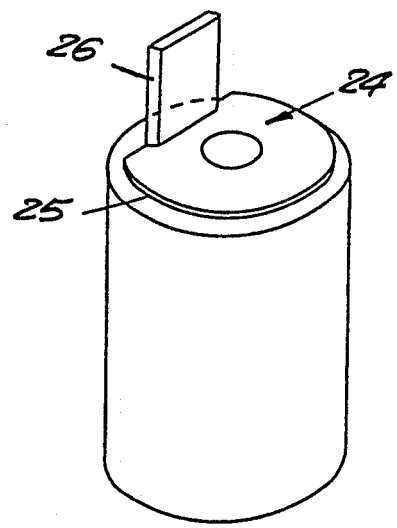
FIG. 6 is a perspective view of an internal structure of an alkaline storage battery according to a fifth embodiment of the present invention.

FIG. 6 shows an internal structure of an alkaline storage battery according to a fifth embodiment of the present invention. The alkaline storage battery of the fifth embodiment is a nickel-cadmium storage battery having the nominal capacity of 1.2 Ah, and differs from the alkaline storage battery shown in FIG. 1 in that only a single upper current collector tab 24 is employed. The upper current collector tab 24 comprises a substantially circular current collecting tab 25 welded to the terminal edge of the positive electrode and a rectangular lead tab 26 connected to and extending upwardly from the current collecting tab 15. The current collecting tab 25 has a thickness of 0.15 mm, and the lead tab 26 has a thickness of 0.50 mm. The thicker lead tab 26 has a reduced electric resistance to the passage of a current therethrough. The storage battery illustrated in FIG. 6 will be referred to as a storage battery F. The internal resistance of the storage battery F is about 20% lower than the internal resistance of a conventional nickel-cadmium storage battery. The lower current collector tab may be identical in configuration to the upper current collector tab 24.

The concept of using a thicker lead tab in the fifth embodiment may be combined with any of the previous embodiments.

Figure 7:
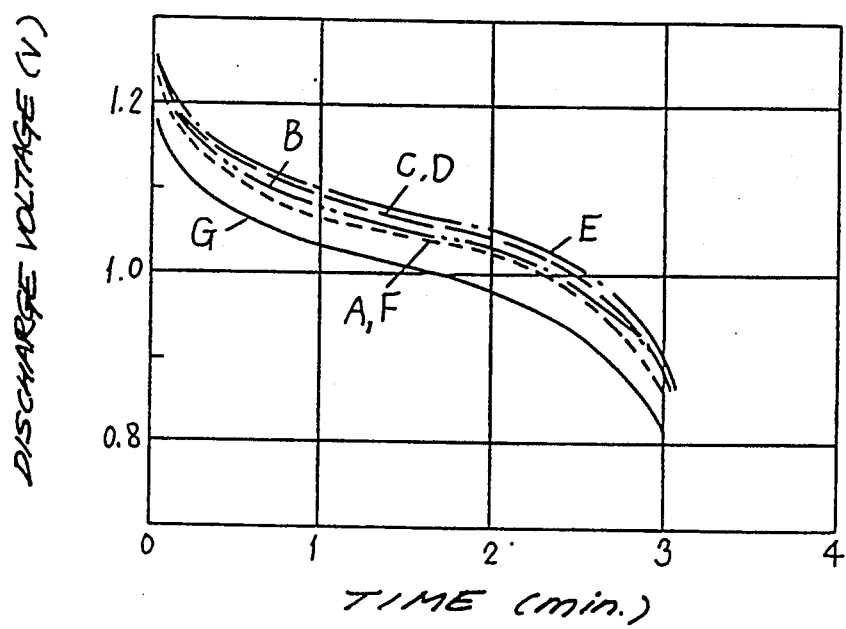
FIG. 7 is a graph showing discharge performances of the alkaline storage batteries of the present invention and a conventional alkaline storage battery.
Figure 8:
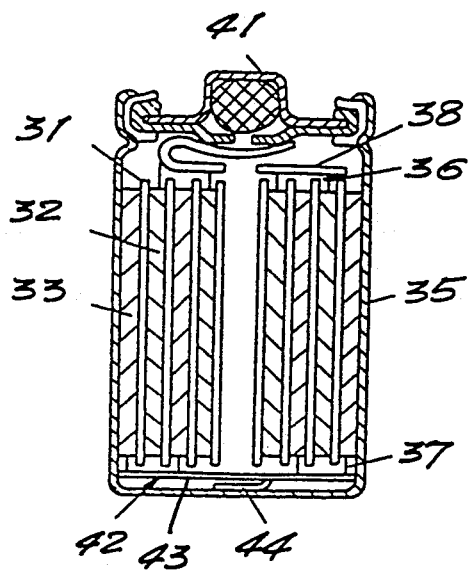
FIG. 8 is a longitudinal cross-sectional view of a conventional alkaline storage battery.
Figure 9:
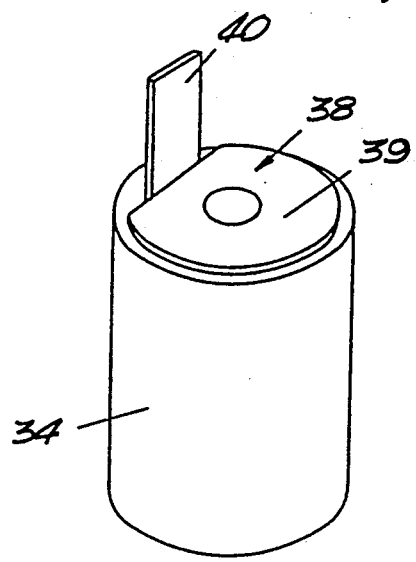
FIG. 9 is a perspective view of an internal structure of the conventional alkaline storage battery.

FIG. 7 shows the discharge voltages of the storage batteries A, B, C, D, E, F of the present invention and a conventional storage battery G, the discharge voltages being plotted against time after the storage batteries have fully be charged and then discharged with a current of 20 A flowing from the storage batteries. It can be seen from FIG. 7 that the storage batteries A, B, C, D, E, F with the reduced internal resistance exhibit higher high-rate discharge performances and higher discharge voltages than the conventional storage battery G.

With the present invention, as described above, since the electric resistance of the current collector tab or tabs is reduced, the alkaline storage battery has higher high-rate discharge performance, i.e., can keep a higher discharge voltage upon a high-rate discharge.

Although certain preferred embodiments have been shown and described, it should be understood that many changes and modifications may be made therein without departing from the scope of the appended claims.

What is claimed is:

1. An alkaline storage battery, comprising
   a case serving as one of positive and negative terminals, the case having an opening;

an electrode assembly housed in the case, the electrode assembly comprising a positive electrode and a negative electrode which are wound as spiral coils with a separator interposed therebetween, the positive and negative electrodes having opposite terminal edges;

a sealing cover mounted in the opening with an insulating seal ring therebetween, the sealing cover serving as the other terminal; and a pair of current collector tab means for collecting an electric current, one of the current collector tab means electrically connecting the terminal edge of one of the positive and negative electrodes to the case, the other current collector tab means electrically connecting the terminal edge of the other of the positive and negative electrodes to the sealing cover;

the one current collector tab means comprising a first collector tab comprising a first current collecting tab welded to the terminal edge of one of the electrodes and a first lead tab integral with the first current collecting tab and welded to the sealing cover, and a second current collector tab consisting of a second lead tab welded and electrically connected to the first lead tab of the first current collector tab.

2. An alkaline storage battery according to claim 1, wherein the second lead tab is thicker than the first lead tab.

3. An alkaline storage battery, comprising a case serving as one of positive and negative terminals, the case having an opening;

an electrode assembly housed in the case, the electrode assembly comprising a positive electrode and a negative electrode which are wound as spiral coils with a separator interposed therebetween, the positive and negative electrodes having opposite terminal edges;

a sealing cover mounted in the opening with an insulating seal ring therebetween, the sealing cover serving as the other terminal; and a pair of current collector tab means for collecting an electric current, one of the current collector tab means electrically connecting the terminal edge of one of the positive and negative electrodes to said case, the other current collector tab means electrically connecting the terminal edge of the other of the positive and negative electrodes to the sealing cover, one of the current collector tab means comprising a plurality of current collector tabs comprising a current collecting tab electrically connected to the terminal edge of one of the electrodes and a lead tab electrically connected to one of the case or the sealing cover, the lead tab of one of the current collector tabs being thicker than the lead tab of the other current collector tab.

4. An alkaline storage battery according to claim 3, wherein each of the current collector tabs comprises a current collecting tab electrically connected to the terminal edge of one of the electrodes and a lead tab electrically connected to one of the case and said sealing cover, the current collecting tab of one of said current collector tabs being welded to a portion of the terminal edge of the one electrode and the lead tab thereof being welded to the terminal edge of the one of the case and the sealing cover, the current collecting tab of the other current collector tab being welded to another portion of the terminal edge of the one electrode and the lead tab thereof being welded to the one of the case and the sealing cover.

5. An alkaline storage battery according to claim 3, wherein each of the current collector tabs comprises a current collecting tab electrically connected to the terminal edge of one of the electrodes and a lead tab electrically connected to one of the case and the sealing cover, the current collecting tab of one of the current collector tabs being welded to the terminal edge of said one electrode, and the current collecting tab of the other current collector tab being welded to said first-mentioned current collecting tab.

6. An alkaline storage battery according to claim 3, wherein each of the current collector tabs comprises a substantially circular current collecting tab electrically connected to the terminal edge of one of the electrodes and a lead tab raised from the current collecting tab and electrically connected to one of the case and the sealing cover, the current collecting tab of one of said current collector tabs being welded to a portion of the terminal edge of the one electrode, and the current collecting tab of the other current collector tab being welded to another portion of the terminal edge of the one electrode and also to the first-mentioned current collecting tab, the lead tabs of the current collector tabs being disposed in confronting relation to each other.

7. An alkaline storage battery, comprising a case serving as one of positive and negative terminals, the case having an opening;

an electrode assembly housed in the case, the electric assembly comprising a positive electrode and a negative electrode which are wound as spiral coils with a separator interposed therebetween, the positive and negative electrodes having opposite terminal edges;

a sealing cover mounted in the opening with an insulating seal ring therebetween, the sealing cover serving as the other terminal; and a pair of current collector tabs for collecting an electric current, one of the current collector tabs electrically connecting the terminal edge of one of the positive and negative electrodes to the case, the other current collector tabs electrically connecting the terminal edge of the other of the positive and negative electrodes to the sealing cover, each of the current collector tabs comprising a current collecting tab and a lead tab joined thereto, the lead tab of one of the current collector tabs being thicker than the current collecting tab thereof.

8. An alkaline storage battery according to claim 7, wherein the current collecting tab which is thinner than the lead tab of the one current collector tab is of such a thickness as to reduce a loss current which flows through the surface of the current collecting tab when the one current collector tab is welded to the marginal edge of the one electrode.

* * * * *